(12) United States Patent
Morimitsu et al.

(10) Patent No.: US 8,808,438 B2
(45) Date of Patent: *Aug. 19, 2014

(54) AMORPHOUS MATERIALS FOR USE IN PHASE CHANGE INKS

(71) Applicant: Xerox Coporation, Norwalk, CT (US)

(72) Inventors: Kentaro Morimitsu, Mississauga (CA); Adela Goredema, Mississauga (CA); Naveen Chopra, Oakville (CA); Jennifer L. Belelie, Oakville (CA); James D. Mayo, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/741,354

(22) Filed: Jan. 14, 2013

(65) Prior Publication Data

US 2014/0200368 A1    Jul. 17, 2014

(51) Int. Cl.
    *C09D 11/02* (2014.01)

(52) U.S. Cl.
    CPC ..................................... *C09D 11/03* (2013.01)
    USPC ...................... 106/31.29; 106/31.61; 564/152

(58) Field of Classification Search
    USPC .............................. 106/31.29, 31.61; 564/152
    See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise et al. | |
| 5,231,135 A | 7/1993 | Machell et al. | |
| 5,389,958 A | 2/1995 | Bui et al. | |
| 5,621,022 A | 4/1997 | Jaeger et al. | |
| 6,221,137 B1 | 4/2001 | King et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,427,323 B1 | 9/2008 | Birau et al. | |
| 7,973,186 B1 | 7/2011 | Goredema et al. | |
| 8,551,236 B1 * | 10/2013 | Morimitsu et al. | 106/31.29 |
| 2012/0272864 A1 * | 11/2012 | Morimitsu et al. | 106/31.61 |
| 2013/0284059 A1 * | 10/2013 | Chopra et al. | 106/31.61 |
| 2013/0284062 A1 * | 10/2013 | Morimitsu et al. | 106/31.61 |

OTHER PUBLICATIONS

U.S. Appl. No. 13/681,106, filed Nov. 19, 2012, Goredema, et al.
U.S. Appl. No. 13/680,716, filed Nov. 19, 2012, Vanbesien, et al.
U.S. Appl. No. 13/457,157, filed Apr. 26, 2012, Iftime, et al.
U.S. Appl. No. 13/456,847, filed Apr. 26, 2012, Iftime, et al.
U.S. Appl. No. 13/095,636, filed Apr. 27, 2011, Belelie, et al.

* cited by examiner

*Primary Examiner* — Shailendra Kumar

(74) *Attorney, Agent, or Firm* — Pillsbury Winthrop Shaw Pittman LLP

(57) ABSTRACT

An amorphous compound for use in phase change ink composition suitable for ink jet printing, including printing on coated paper substrates. In embodiments, the phase change ink composition comprises an amorphous compound and a crystalline compound which is derived from bio-renewable materials. The composition provides for a robust, rapid crystallization ink composition.

20 Claims, 4 Drawing Sheets

AMORPHOUS MATERIALS FOR USE IN PHASE CHANGE INKS

CROSS-REFERENCE TO RELATED APPLICATIONS

Reference is made to commonly owned and co-pending, U.S. patent application Ser. No. 13/741,335 entitled "Phase Change Inks Comprising Crystalline-Amorphous Mixtures" to Kentaro Morimitsu et al., electronically filed on the same day herewith.

BACKGROUND

The present embodiments relate to phase change ink compositions characterized by being solid at room temperature and molten at an elevated temperature at which the molten ink is applied to a substrate. These phase change ink compositions can be used for ink jet printing. The present embodiments are directed to a novel phase change ink composition comprising an amorphous compound, a crystalline compound, and optionally a colorant, and methods of making the same. The specific formulations described herein, including a combination of an amorphous compound and crystalline compound which provide fast crystallizing ink compositions that form high quality images when printed on coated paper substrates.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions, preferably those derived from bio-renewable sources, for phase change ink compositions and future printing technologies to provide customers with excellent image quality on all substrates. There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided In particular, the present embodiments provide a phase change ink component comprising: an amorphous compound being a diamide derivative of isophorone diamine.

In further embodiments, there is provided a phase change ink component comprising: an amorphous compound being a diamide derivative of isophorone diamine and being synthesized from isophorone diamine and an acid or acid chloride by an amidation reaction as shown below:

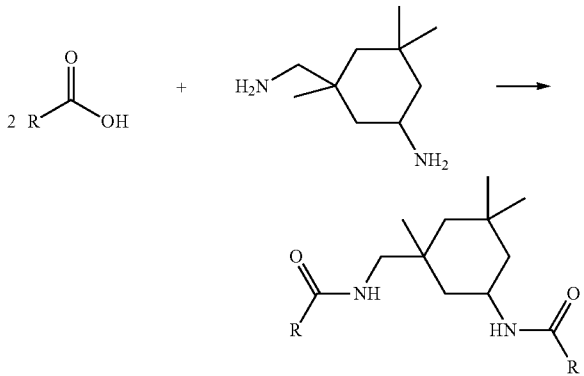

wherein R is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof.

In yet other embodiments, there is provided a phase change ink component comprising: an amorphous compound being a diamide derivative of isophorone diamine selected from the group consisting of

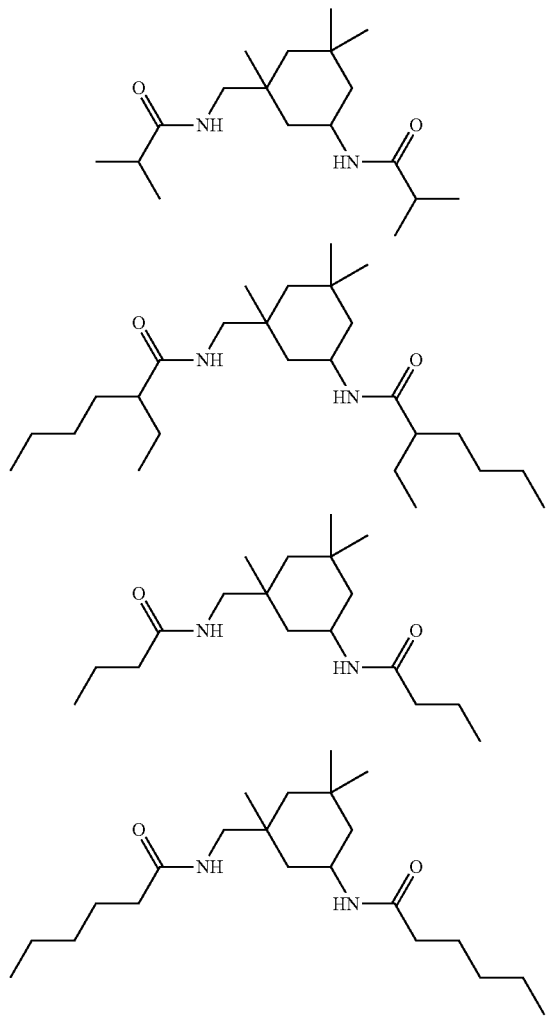

and mixtures thereof.

BRIEF DESCRIPTION OF THE DRAWINGS

For a better understanding of the present embodiments, reference may be had to the accompanying figures.

DETAILED DESCRIPTION

Figure 1:
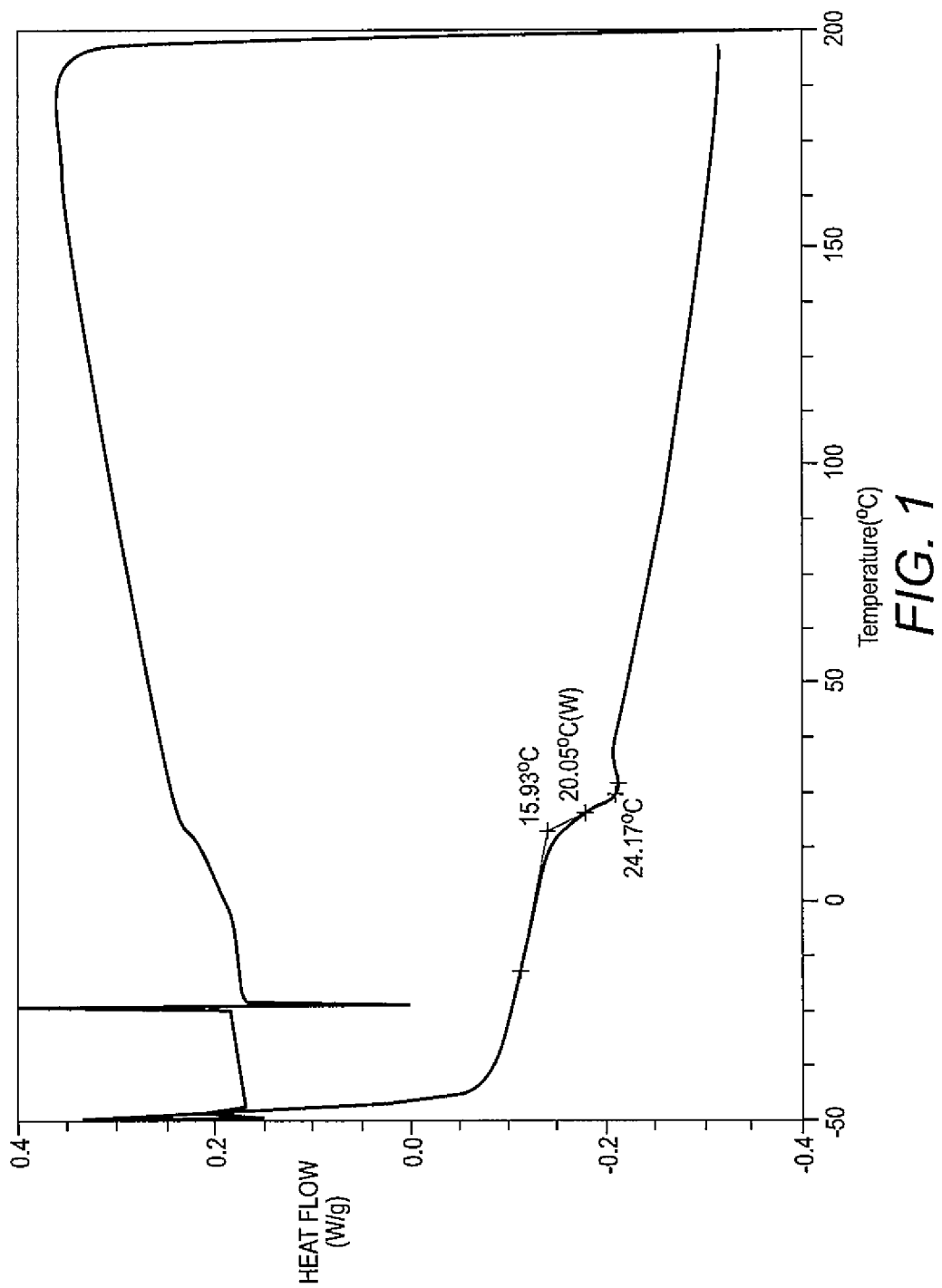
FIG. 1 is a graph illustrating differential scanning calorimetry (DSC) data of an amorphous component made according to the present embodiments.

In the following description, it is understood that other embodiments may be utilized and structural and operational changes may be made without departure from the scope of the present embodiments disclosed herein.

Phase change ink technology broadens printing capability and customer base across many markets, and the diversity of printing applications will be facilitated by effective integration of printhead technology, print process and ink materials. The phase change ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

Conventional phase change ink technology has been successful in producing vivid images and providing economy of jet use and substrate latitude on porous papers. However, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components. There is a further need for printing these inks at high speeds as required by digital presses in production environment.

It was previously discovered that using a mixture of crystalline and amorphous small molecule compounds in phase change ink formulations provides robust inks, and in particular, phase change inks which demonstrate robust images on coated paper, as disclosed in U.S. patent application Ser. No. 13/095,636 to Jennifer L. Belelie et. al. filed Apr. 27, 2011, and hereby incorporated by reference in its entirety. Print samples made with such phase change inks demonstrate better robustness as compared to currently available phase change inks.

It has been discovered that fast crystallization of a composition made of a crystalline and an amorphous component is not an inherent property of the composition. The rate of crystallization of the crystalline/amorphous mixture is a function of not only the crystalline and amorphous components independently, but even more importantly, is influenced by the selection of the pair of crystalline and amorphous materials. For example, a given crystalline component may provide a fast crystallizing composition when mixed with one amorphous component but the same crystalline component can result in a slow crystallizing composition when mixed with a different amorphous component. The relationship between the chemical structures of the pair of crystalline and amorphous components controls the rate of crystallization of a given mixture. However, then the selection of the particular pair of crystalline and amorphous components to provide fast crystallizing inks is complicated.

The present embodiments provide a formulation for ink compositions that are based on crystalline and amorphous components which not only provide robust inks, and in particular, phase change inks which demonstrate robust images on coated paper, but further is fast crystallizing and derived from bio-renewable materials.

The present embodiments provide a new type of ink jet phase change ink composition which comprises a blend of (1)

crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10.

Each compound or component imparts specific properties to the phase change inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

U.S. patent application Ser. No. 13/457,157 to Gabriel Iftime et al., electronically filed on Apr. 26, 2012 discloses one method to achieve fast solidifying inks by using a composition wherein the crystalline and amorphous components have limited compatibility, which is hereby incorporated by reference in its entirety. By limited compatibility, it is meant that the two components have a tendency to quickly phase separate when cooled down from a molten state. Limited compatibility is achieved by selecting the crystalline and amorphous components such as to satisfy a set of design rules regarding the relationship between the functional groups present in the chemical structures of a selected pair of a crystalline and amorphous components respectively to provide the ability to rapidly crystallize. Briefly, the design rules are set forth below:

(1) The phase change ink composition comprises an amorphous compound and a crystalline compound;

(2) The amorphous compound comprises an amorphous core moiety having at least one functional group and being attached to at least one amorphous terminal group, wherein the amorphous terminal group comprises an alkyl group, wherein the alkyl is straight, branched or cyclic, saturated or unsaturated, substituted or unsubstituted, having from about 1 to about 40 carbon atoms; a diagram showing the structure of an amorphous compound is shown below:

Amorphous Compound

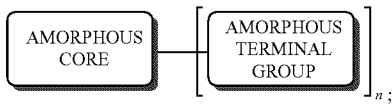

n = 1-4

(3) The crystalline compound comprises a crystalline core moiety having at least one functional group and being attached to at least one crystalline terminal group, wherein the crystalline core group comprises an aromatic group; a diagram showing the structure of a crystalline compound is shown below:

Crystalline Compound

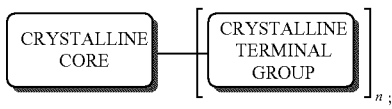

n = 1-4 and (4) No one functional group in the amorphous core moiety is the same as any of the functional group of the crystalline core moiety.

In particular, the present embodiments contain inexpensive sharp-melting crystalline materials derived from fatty monoalcohols and a diacid, such as terephthalic acid, which functions as the phase-change component, in addition to other di-esters which function as the amorphous binder resins. The fatty alcohols give the ink some hydrophobic character which helps increase ink spreadability, an improvement from other ink formulations. The crystalline materials are both inexpensive and biodegradable. The phase change inks made from these materials demonstrate excellent robustness as compared to commercially available phase change inks on the same substrate.

In order to evaluate the suitability of a test ink for fast printing, a quantitative method for measuring the rates of crystallization of phase change inks containing crystalline components was developed. Time-Resolved Optical Microscopy (TROM) provides comparison between various test samples and, as a result, is a useful tool for monitoring the progress made with respect to the design of fast crystallizing inks. TROM is described in U.S. patent application Ser. No. 13/456,847 to Gabriel Iftime et al., electronically filed on Apr. 26, 2012, which is hereby incorporated by reference in its entirety.

TROM monitors the appearance and the growth of crystals by using Polarized Optical Microscopy (POM). The sample is placed between crossed polarizers of the microscope. Crystalline materials are visible because they are birefringent. Amorphous materials or liquids, such as inks in their molten state, that do not transmit light, appear black under POM. Thus, POM provides an image contrast when viewing crystalline components and allows for pursuing crystallization kinetics of crystalline-amorphous inks when cooled from the molten state to a set-temperature. In order to obtain data that allow comparison between different and various samples, standardized TROM experimental conditions were set, with the goal of including as many parameters relevant to the actual printing process. The ink or ink base is sandwiched between 18 mm circular thin glass slides. The thickness of the ink layer is kept at 20-25 μm (controlled with fiberglass spacers) which is close to actual printed ink layers. For rate of crystallization measurement, the sample is heated to the expected jetting temperature (viscosity of about 10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this disclosure). Crystal formation and growth is recorded with a camera.

It should be understood that the crystallization times obtained with the TROM method for selected inks are not identical to what would be the crystallization times of a droplet of ink in an actual printing device. In an actual printing device such as a printer, the ink solidifies much faster. It is determined that there is a good correlation between the total crystallization time as measured by the TROM method and the solidification time of an ink in a printer. In the standardized conditions described above, it is also determined that inks which solidify within 20 seconds, within 15 seconds, or within 10 seconds (i.e., Total crystallization time <20 s, <15 s or <10 s), as measured by the TROM method, are suitable for fast printing, typically at speeds from 100 feet/minute or higher. Therefore, for the purpose of the present disclosure, a rate of crystallization lower than 15 seconds is considered to be fast crystallizing. However, very high speed printing in the order of 500 feet/minute or higher require inks with a crystallization rate as measured by TROM in the range of less than about 7 seconds in the standardized TROM conditions.

In practice, we have found that inks with time$_{total}$ (Crystalline and Amorphous) lower or equal to 15 seconds in the TROM test are suitable for fast printing at speeds of about 100 feet per minute or higher.

In certain embodiments, the total crystallization time of the phase change ink is no more than 5 times the total crystallization time of the crystalline compound alone. In further embodiments, the total crystallization time of the phase change ink is no more than 4 times the total crystallization time of the crystalline compound alone. In yet further embodiments, the total crystallization time of the phase change ink is no more than 3 times the total crystallization time of the crystalline compound alone.

In embodiments, the phase change inks meet certain specific physical properties. For example, the phase change inks of the present embodiments have a melting point ($T_{melt}$) of from about 65° C. to about 150° C. or from about 70° C. to about 140° C., or from about 80° C. to about 135° C. In other embodiments, the ink has a crystallization temperature ($T_{crys}$) of from about 40° C. to about 140° C. or from about 45° C. to about 130° C., or from about 50° C. to about 120° C., as determined by DSC at a rate of 10° C./min. In other embodiments, the ink of the present embodiments has a viscosity of from about 1 to about 22 cps (centipoise) in a jetting range of from about 100 to about 140° C. In particular, the ink of the present embodiments has a viscosity at 140° C. of <12 cps or from about 12 cps to about 3 cps, or from about 10 cps to about 5 cps. The ink may have a viscosity of greater than about $10^6$ cps at room temperature.

The Amorphous Compound

In embodiments, the amorphous compound functions as the binder agent for the crystalline component and any colorants or other minor additives. Prior classes of amorphous materials were found to have some manufacturing disadvantages. For example, it was found that it is very challenging to synthesize such materials under neat conditions, which are very important for reducing cost and reducing the environmental footprint of the material. In the present embodiments, novel amide amorphous materials are disclosed. These amorphous materials were synthesized from isophorone diamine (IPDA) by amidation reaction. Most of these amorphous materials were made under simple neat conditions without use of any solvents. The amorphous materials show no crystallization and relatively low viscosity (<10$^2$ cps) in the jetting range (100-140° C.). The class of amide compounds has not been previously identified as candidates for amorphous materials despite of its strong hydrogen-bonds (H-bonds) formation which is expected to impart robustness on printed image. In many cases, the strong H-bonds establish intermolecular interactions in well-arranged manner to lead crystalline states. In addition, most amides can be easily synthesized under neat conditions.

In general, small molecules tend to crystallize when solidifying and low molecular weight organic solids are crystals. However, small molecule amorphous materials which do not crystallize are required in the present embodiments. High molecular weight amorphous materials such as polymers become viscous and sticky liquids at high temperature, but do not show low enough viscosity. This means polymers cannot be jetted from print head nozzles at desirable jetting temperature (≤140° C.). In the present embodiments, small molecules are targeted to form amorphous solids, but these materials needed to overcome the natural tendency of crystallization. Thus, the present embodiments provide amorphous materials which are diamide derivatives of IPDA, which extends more variations of chemical structures, physical properties, and performance for use in phase change inks.

IPDA was selected as a backbone material because of its nonsymmetrical and branched structure, multi functional groups, mixture of stereoisomers, and low cost. In addition, there are many possibilities to derive amides or ureas by reacting one or two amine groups on the core ring. Generally, the amorphous compound is a diamide of IPDA having the formula:

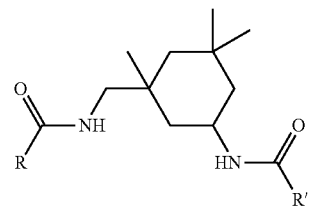

wherein R and R' each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof.

An amidation was conducted by a simple one-step reaction as shown below in Scheme 1.

Scheme 1

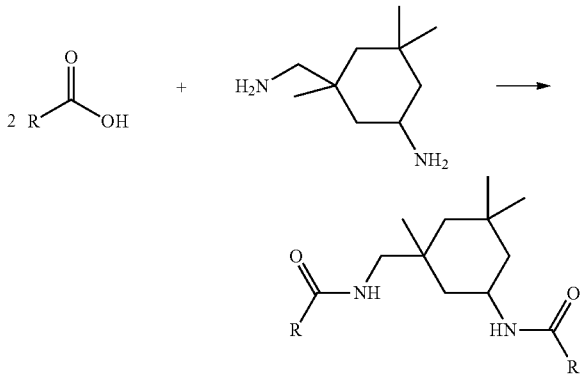

wherein R is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof. Varieties of acids or acid chloride were reacted with IPDA to form corresponding diamides. These acids or acid chloride include, but are not limited to pivaloyl chloride, 2-ethylhexanoic acid, butyric acid, hexanoic acid and mixtures thereof. Obtained compounds were non-crystallizing amorphous solids. The amorphous diamides are selected from the group consisting of

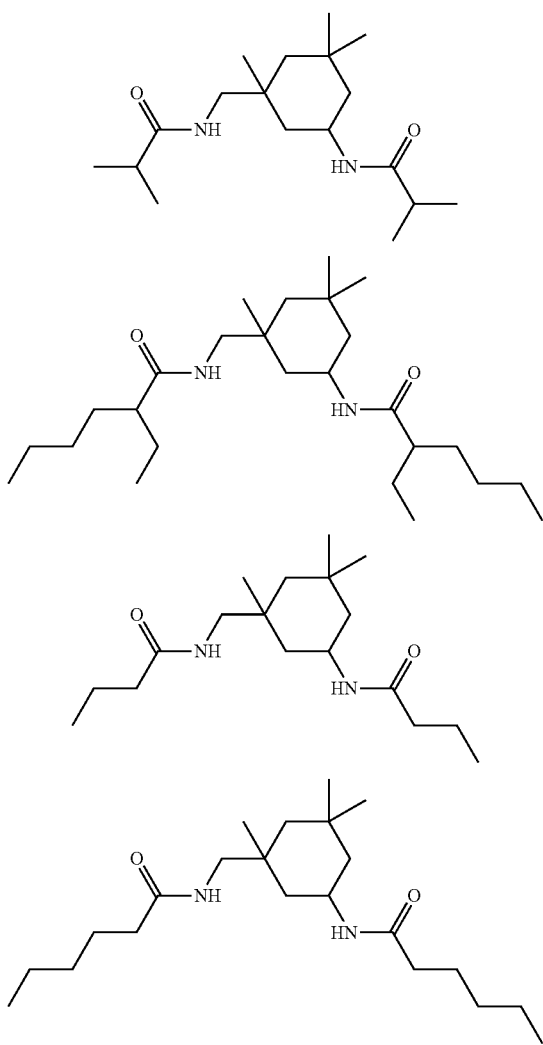

and mixtures thereof. Physical properties of some amorphous IPDA diamides are shown in Table 1.

TABLE 1

| Compound | R (reactant) | | Acid Value (mgKOH/g) | Tg (° C.) | Viscosity @ 140° C. (cps) |
|---|---|---|---|---|---|
| 1 | Cl—C(=O)—C(CH3)3 | Pivaloyl chloride | — | *43.6 | ND |
| 2 | HO—C(=O)—CH(C2H5)(CH2)3CH3 | 2-ethyl-hexanoic acid | 21.2 | 52 | 198 |
| 3 | HO—C(=O)—(CH2)2CH3 | Butyric acid | 24.4 | 32 | 148 |

TABLE 1-continued

| Compound | R (reactant) | | Acid Value (mgKOH/g) | Tg (° C.) | Viscosity @ 140° C. (cps) |
|---|---|---|---|---|---|
| 4 | HO—C(=O)—(CH2)4CH3 | Hexanoic acid | 4 | 20 | 98.8 |

*semicrystalline, also has Tmelt 170° C. and Tcrys 119° C.

Figure 2:
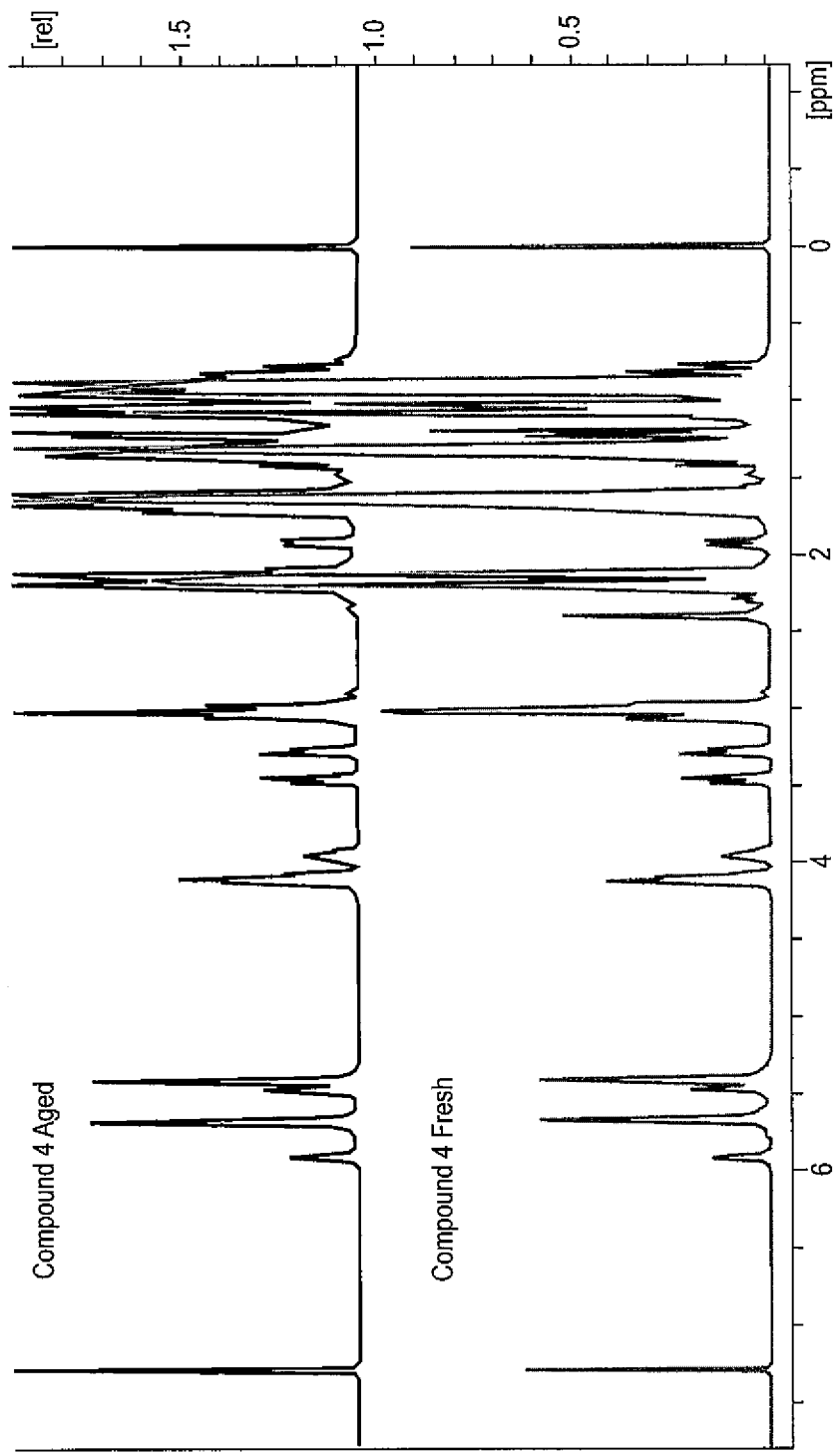
FIG. 2 is a $^1$H NMR spectra of aged (top) and fresh (bottom) sample of an amorphous component made according to the present embodiments.
Figure 3:
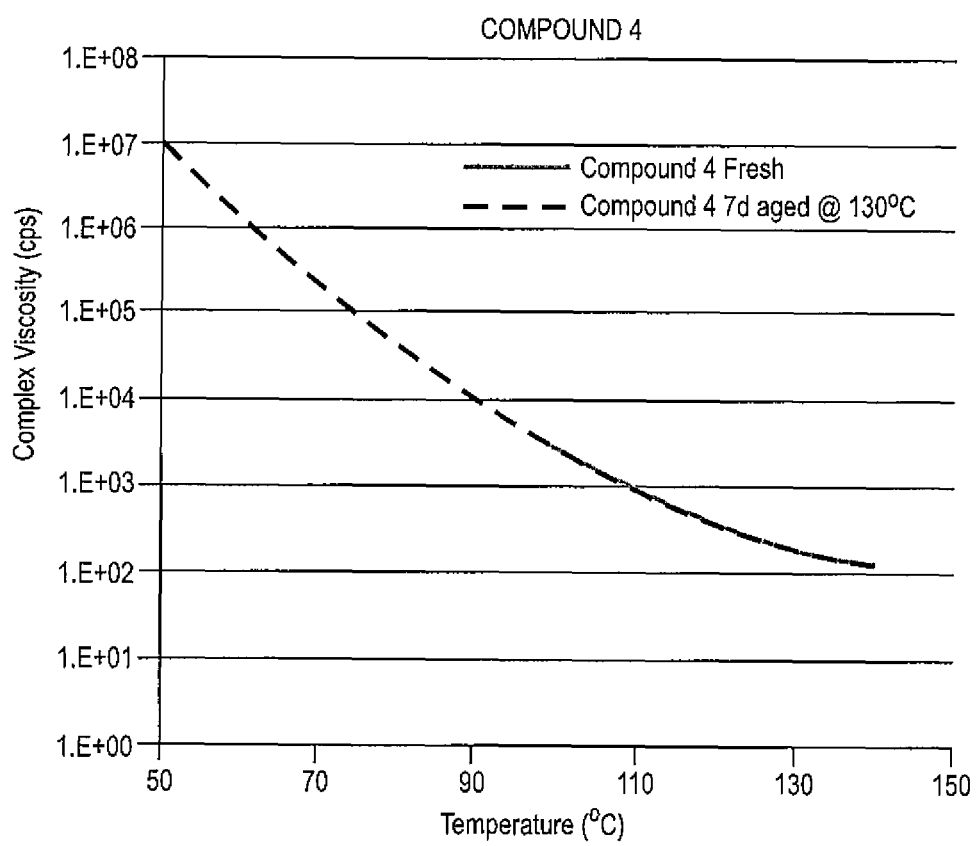
FIG. 3 is a graph illustrating rheology data of aged (dotted line) and fresh (solid line) sample of an amorphous component made according to the present embodiments.

Another important requirement for the phase change ink of the present embodiments is for the ink components to be stable at the high jetting temperatures for a prolonged period of time. Compound 4 in Table 1 was aged in the oven at 140° C. for seven days to test its stability. FIG. 2 shows the $^1$H NMR spectra of the aged and fresh samples which are very similar indicating that this amorphous sample is stable at high jetting temperatures. Rheology data (FIG. 3) also indicates the amorphous is thermally stable.

In general embodiments, the amorphous compound has Tg of from about −20 to about 50° C., or of from about −10 to about 40° C., or of from about 0 to about 30° C. In further embodiments, the amorphous compound has a relatively low viscosity (<200 cps, or from about 1 to about 200 cps, or from about 5 to about 150 cps) near the jetting temperature (≤140° C., or from about 100 to about 140° C., or from about 105 to about 140° C.) but very high viscosity (>10$^5$ cps) at room temperature.

In embodiments, the amorphous compounds are formulated with a crystalline compound to form a phase change ink composition. The crystalline component is an ester. This class of materials is well known to be readily biodegradable. The ink compositions show good rheological profiles. Print samples created by the phase change ink composition on coated paper by K-proof exhibit excellent robustness.

In embodiments, the amorphous material is present in an amount of from about 5 percent to about 40 percent by weight, or from about 5 percent to about 35 percent by weight, or from about 10 percent to about 30 percent by weight of the total weight of the ink composition.

The Crystalline Compound

In embodiments, the crystalline compound is a di-ester compounds made from Scheme 2 below which is disclosed in U.S. patent application Ser. No. 13/681,106 entitled "Biorenewable Fast Crystallizing Phase Change Inks" to Adela Goredema et al., and hereby incorporated by reference in its entirety Scheme 2

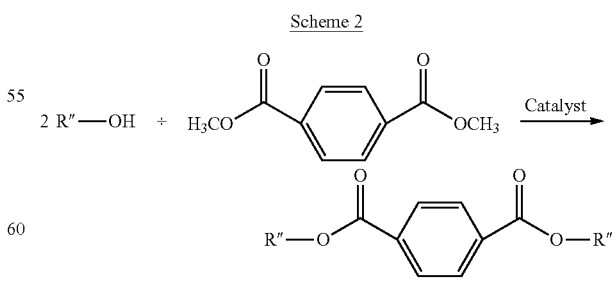

wherein R″ is a saturated or ethylenically unsaturated aliphatic group in one embodiment with at least about 6 carbon atoms, and in another embodiment with at least about 8 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges. In a specific embodiment, the crystalline compound is derived from natural fatty alcohols such as octanol, stearyl alcohol, lauryl alcohol, behenyl alcohol, myristyl alcohol, capric alcohol, linoleyl alcohol, and the like. The above reaction may be conducted by combining dimethyl terephthalate and alcohol in the melt in the presence of a tin catalyst, such as, dibutyl tin dilaurate (Fascat 4202), dibutyl tin oxide (Fascat 4100); a zinc catalyst, such as Bi cat Z; or a bismuth catalyst, such as Bi cat 8124; Bi cat 8108, a titanium catalyst such as titanium dioxide. Only trace quantities of catalyst are required for the process.

In embodiments, the catalyst is present in an amount of about 0.01 weight percent to 2 weight percent or of about 0.05 weight percent to about 1 weight percent of the total product.

The reaction is carried out at an elevated temperature of about 150° C. to about 250° C. or from about 160° C. to about 210° C. The solvent-free process is environmentally sustainable and eliminates problems with byproducts and also means higher reactor throughput.

Most of these alcohols are bio-renewable materials derived from plant oils such as cotton, coconut, palm kernel, castor beans, rapeseed, soybeans, and sunflowers. These alcohols are reacted with dimethyl terephthalate or terephthalic acid to give the corresponding di-ester. Bio-renewable terephthalic acid is not yet available, however, there is a strong effort by many companies to have it available in the next few years. Therefore, the potential of having 100% bio-renewable dialkyl terephthalates in the near future for use with the present embodiments is high.

Specific alcohols for use to make the di-ester compounds (for use as the crystalline compound) is shown in Table 2. All 3 compounds showed very sharp transitions within the desirable temperature range (i.e., 60° C.<T<130° C.) (Table 2) indicating promising properties for the phase changing material of the ink.

TABLE 2

| Compound | R''—OH | Bio-renewable Content (%)* | $T_{melt}$ (° C.) (DSC) | $T_{cryst}$ (° C.) (DSC) | Viscosity at 140° C. (cps) |
|---|---|---|---|---|---|
| 5 | Stearyl alcohol (CH$_3$(CH$_2$)$_{17}$OH) | 80 | 88 | 79 | 4.5 |
| 6 | Behenyl Alcohol (CH$_3$(CH$_2$)$_{21}$OH) | 83 | 95 | 82 | 4.8 |
| 7 | Lauryl Alcohol (CH$_3$(CH$_2$)$_{11}$OH) | 73 | 70 | 60 | Not Determined |

*Note:
All these materials have a very high potential to have 100% BRC since there is a lot of effort in making bio-renewable TPA The bio-renewable content is based on the weight percent of bio-based materials. All of the starting materials used to make the crystalline components of the present embodiments are inexpensive. Moreover, these materials are prepared by simple, low-cost and environmentally benign synthetic routes using solvent-less condensation procedures with methanol as the only by-product.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>10$^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The ΔT between $T_{melt}$ and $R_{crys}$ is less than about 55° C.

In embodiments, the crystalline material is present in an amount of from about 60 percent to about 95 percent by weight, or from about 65 percent to about 95 percent by weight, or from about 70 percent to about 90 percent by weight of the total weight of the ink composition.

Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl) benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorants

In embodiments, the phase change ink compositions described herein also include a colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2G01 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic.

Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPA-PER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis Procedure for Compound 1

To a 3 neck 100 mL round bottomed flask equipped with an argon inlet and rubber septum was added triethyl amine (7.85 grams, 77.51 mmoles, available from Sigma Aldrich) and dichloromethane dried with molecular sieves (50 mL). The flask was cooled to 0° C. with an ice bath. Pivaloyl chloride (8.50 grams, 70.46 mmoles, available from Sigma Aldrich) was slowly added via a syringe during which solution turned light yellow. Slowly added 3-(aminomethyl)-3,5,5-trimethyl-cyclohexylamine (IPDA, 6.0 grams, 35.23 mmoles, available from Sigma Aldrich) during which a white precipitate started to form. Added more dichloromethane (25 mL) and removed ice bath. Stirred overnight at room temperature (~20 hours). Quenched with saturated sodium hydrogen carbonate (100 mL) during which all the solid residue dissolved. Diluted with dichloromethane (100 mL). Added mixture to a separatory funnel and extracted with dichloromethane (2×50 mL). Combined organic layers were washed with water (2×100 mL), dried with magnesium sulphate, filtered and rotavoped to remove solvents resulting in a white powder. Further dried product using vacuum to give 11.64 grams (97% yield). H NMR indicated that the desired product was formed. Table 1 shows the physical properties.

Example 2

Synthesis Procedure for Compound 4

To a 3 neck 100 mL round bottomed flask equipped with a Dean-Stark trap and condenser, thermocouple and argon inlet was added 3-(aminomethyl)-3,5,5-trimethylcyclohexylamine (IPDA, 20 grams, 117.44 mmoles, available from Sigma Aldrich (St. Louis, Mo.)) and hexanoic acid (27.28 grams, 234.88 mmoles, available from Sigma Aldrich). The mixture was slowly heated under argon to 160° C. during which reagents melted/dissolved. The temperature was raised to 180° C. The reaction mixture was stirred at 180° C. overnight (~20 hours) during 3.1 mL of water was collected in Dean-Stark trap. Vacuum was applied (1-2 mm-Hg) for ~10 minutes. Cooled under argon to ~140° C. and discharged in an aluminum tray, cooled to room temperature to give 37.8 grams (88% yield) product as a glassy light brown solid. $^1$H NMR indicated that the desired product was formed. Table 1 shows the physical properties.

Example 3

Synthesis Procedure for Compound 3

This diamide was made using the same procedure as Example 2 except that butyric acid was used in place of hexanoic acid.

Example 4

Synthesis Procedure for Compound 2

This diamide was made using the same procedure as Example 2 except that 2-ethyhexanoic acid was used in place of hexanoic acid.

Material Properties

Differential scanning calorimetry (DSC) data of the Example 2 diamide showed glass transition and no crystallization peak (as shown in FIG. 1), which indicates the material is an amorphous solid. The glass transition temperatures (Tg) is 20° C. The Example 2 diamide also has relatively low viscosity (<$10^2$ cps) at high temperatures (>100° C.), which makes the material a good candidate for the amorphous component of robust ink.

Example 5

Synthesis of Distearyl Terephthalate (Compound 5)

To a 2 L Buchi reactor equipped with a double turbine agitator and distillation apparatus was charged Dimethyl terephthalate (315.8 grams), Stearyl Alcohol (879.7 grams) and heated to 130° C. under Nitrogen purge for 1 hour, after which stirring was commenced followed by the addition of Tyzor catalyst (3.0 grams, available from Dupont). The reaction mixture was then heated to 145° C., followed by slowly ramping the temperature to 190° C. over a 3-4 hour period such that the evolution of methanol is distilled in a controlled manner. The reaction temperature was maintained at 190° C. for an additional 16 hours until >96% conversion to the product was achieved as determined by $^1$H NMR spectroscopy. The product was discharged as a low viscosity liquid which solidified on cooling to give a 1050 gram of a white solid (96.2% yield). The product was shown to be pure by $^1$H NMR spectroscopy with trace amounts of the mono-ester. Physical properties of this compound are shown in Table 2.

Example 6

Formulation of Inks

Ink samples were formulated from Compound 4 and Compound 2, a crystalline material (Distearyl terephthalate (DST) (described above and U.S. patent application Ser. No. 13/681,106 entitled "Bio-Renewable Fast Crystallizing Phase Change Inks" to Goredema et al., which is hereby incorporated by reference in its entirety) and a pigment concentrate. Process for making pigment concentrate is described in U.S. patent application Ser. No. 13/680,716 entitled "Pigmented Magenta and Cyan Phase Change Inks" to Vanbesien et al., which is hereby incorporated by reference in its entirety) The formulations are shown in Table 3 and the ink samples were labeled as Ink 1 and Ink 2. The pigment concentrates contained DST crystalline, cyan pigment B4G, polyethyleneimine dispersant (described in U.S. Pat. No. 7,973,186, which is hereby incorporated by reference in its entirety) and SunFlo SFD-B124 synergist. The pigment contents of the pigment concentrates for Ink 1 and Ink 2 were 15% and 25%, respectively. Those ratios provided each resulting ink 2% pigment loading.

The ink concentrate vehicle was comprised of DST (89.6 g) and polyethyleneimine dispersant (32.0 g), to which was added the synergist Solsperse 5000, available from Lubrizol Corp. (6.4 g), and the pigment Hostaperm Blue B4G, available from Clariant Corp. (32.0 g). To the stirred ink concentrate (12.0 g) was slowly added a homogeneous molten mixture of the diluent (138.0 g) described above. The resulting ink was stirred using a magnetic stir bar for a period of 1 hour at a temperature of 120° C.

TABLE 3

| | Ink 1 | | Ink 2 | |
|---|---|---|---|---|
| Component | Relative Parts (wt %) | Weight (g) | Relative Parts (wt %) | Weight (g) |
| DST (crystalline) | 67.55 | 6.75 | 72.9 | 7.29 |
| Compound 4 | 19.22 | 1.91 | | |
| Compound 2 | | | 19.1 | 1.91 |
| Cyan pigment concentrate (B4G) | 13.33 | 1.33 | 8 | 0.8 |
| Total | 100 | 10 | 100 | 10 |

Ink concentrates were prepared using a Union Process Model 01 attritor, charged with 1800 g of ⅛" Grade 440C stainless steel media. Components of the concentrate vehicle were melted and stirred in a beaker until homogeneous, and then charged into the attritor. While stirring at 100 rpm, the synergist powder was added over the course of 2-3 minutes, followed by the pigment Hostaperm Blue B4G, available from Clariant Corporation, which was added over the course of 5 minutes. The mixture was stirred at 100 rpm for 30 minutes to allow for sufficient wetting of the dry powders, and then the milling speed increased to 300 rpm for a period of about 18 hours. The resulting ink concentrate was then separated from the dispersion media by filtration.

Inks were prepared by adding a homogeneous molten diluent mixture to the aforementioned molten ink concentrate, which was stirred at 350 rpm using a magnetic stir bar. In each case below, the diluent mixture was comprised of distearyl terephthalate (DST) (109.3 g), and the amorphous resin Compound 2 (28.7 g).

Figure 4:
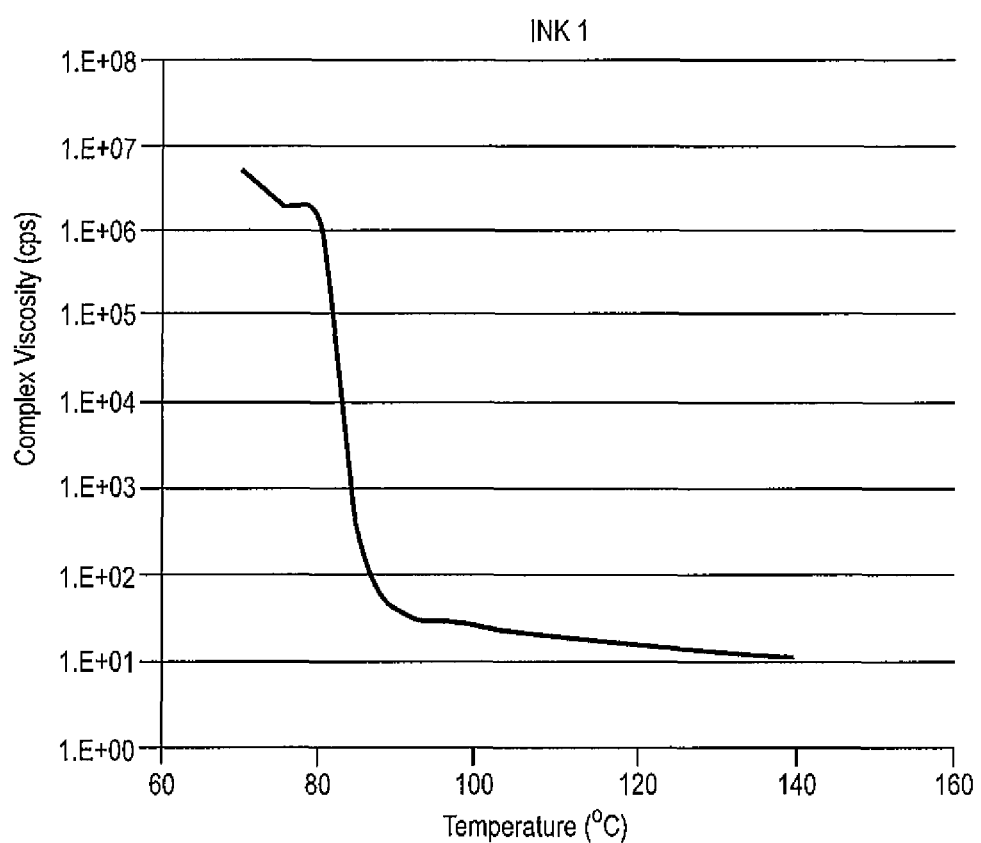
FIG. 4 is a graph illustrating rheology data of a phase change ink made with an amorphous component made according to the present embodiments.

FIG. 4 shows rheology data of ink sample Ink 1. The ink showed sharp phase transition to >$10^6$ cps at around 90° C., and the viscosity at 140° C. was about 11.05 cps which is very close to an acceptable jetting viscosity (10 cps). Further reduction in viscosity can be achieved by using a viscosity modifier or reducing the amount of amorphous material.

Ink Testing and Evaluations

Rate of Crystallization

Rate of crystallization is a very important characteristic of production inks. It dictates the rate at which the ink can be touched after printing which affects the printing speed and showthrough for regular paper. The faster the rate of crystallization, the faster the printing speed. An ink base sample was made from 80 wt % of DST crystalline and 20 wt % of Compound 4. The rate of crystallization was measured using Time Resolved Optical Microscopy (TROM) experiments which are described in U.S. patent application Ser. No. 13/456,847 to Gabriel Iftime et al., electronically filed on Apr. 26, 2012, which is hereby incorporated by reference in its entirety.

The ink base from Compound 4 showed very fast crystallization rate of 5 sec in total (4 sec for crystallization onset time and 1 sec for crystallization elapse time). That result was comparable to the current mainline Chandra ink and indicated that the amorphous did not affect rate of crystallization.

Robustness Test

Inks 1 and 2 were printed onto Xerox® Digital Color Elite Gloss, 120 gsm (DCEG) coated papers using the K-proofer gravure printing plate, which is rigged with a pressure roll set at low pressure. The gravure plate temperature was set at 142° C., but the actual plate temperature is about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. The inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

SUMMARY

In summary, the present embodiments provide amorphous materials comprising diamides and methods for synthesizing the same from isophorone diamine (IPDA). Most of these materials can be synthesized using simple neat conditions. These amorphous materials showed preferable physical properties to form robust phase change ink. The present embodiments also provide robust phase change inks comprising the amorphous materials.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink component comprising:
an amorphous compound being a diamide derivative of isophorone diamine.

2. The phase change ink component of claim 1, wherein the amorphous compound has a general formula of

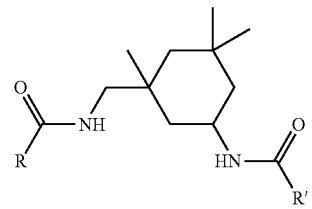

wherein R and R' each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof.

3. The phase change ink component of claim 1, wherein the amorphous compound has a Tg of from about −20 to about 50° C.

4. The phase change ink component of claim 3, wherein the amorphous compound has a Tg of from about −10 to about 40° C.

5. The phase change ink component of claim 4, wherein the amorphous compound has a Tg of from about 0 to about 30° C.

6. The phase change ink component of claim 1, wherein the amorphous compound has a viscosity of less than about 200 cps at 140° C.

7. The phase change ink component of claim 6, wherein the amorphous compound has a viscosity of from about 1 to about 200 cps at 140° C.

8. The phase change ink component of claim 7, wherein the amorphous compound has a viscosity of from about 5 to about 150 cps at 140° C.

9. The phase change ink component of claim 1, wherein the amorphous compound has a viscosity of greater than about $10^5$ cps at room temperature.

10. The phase change ink component of claim 1, wherein the amorphous compound is synthesized from isophorone diamine by an amidation reaction.

11. The phase change ink component of claim 10, wherein the synthesis of the amorphous compound is conducted optionally with solvents.

12. A phase change ink comprising the phase change ink component of claim 1.

13. A phase change ink component comprising:
an amorphous compound being a diamide derivative of isophorone diamine and being synthesized from isophorone diamine and an acid or acid chloride by an amidation reaction as shown below:

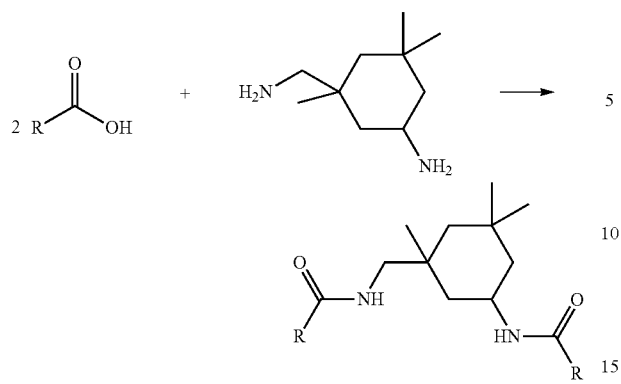

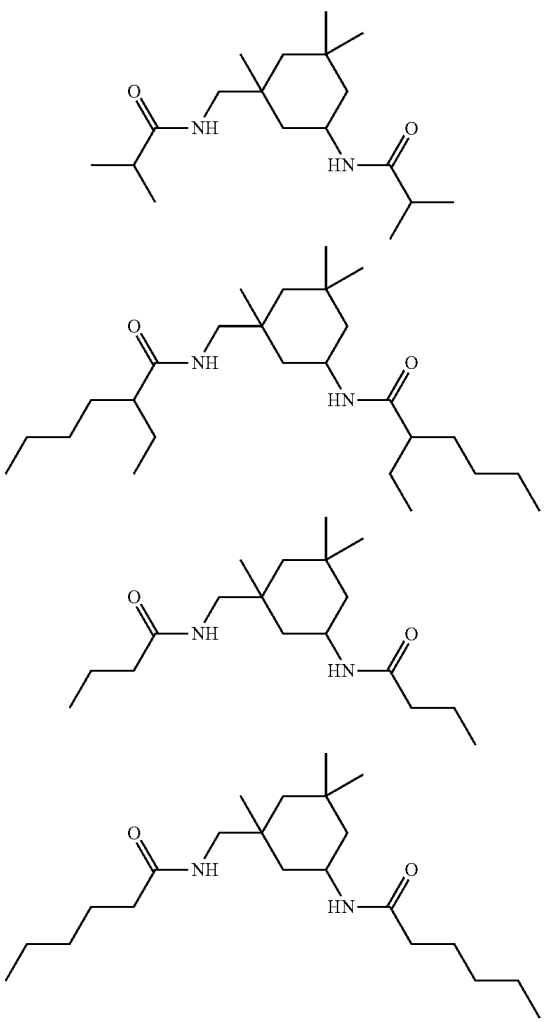

18. A phase change ink component comprising:
an amorphous compound being a diamide derivative of isophorone diamine selected from the group consisting of wherein R is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof.

14. The phase change ink component of claim 13, wherein the acid or acid chloride is selected pivaloyl chloride, 2-ethylhexanoic acid, butyric acid, hexanoic acid and mixtures thereof.

15. The phase change ink component of claim 13, wherein the amorphous compound has a general formula of

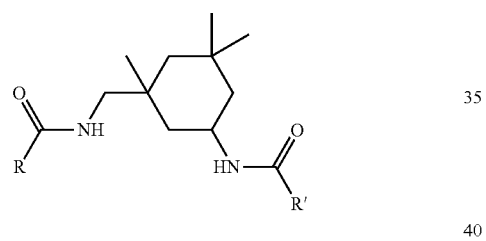

wherein R and R' each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms, or an substituted or unsubstituted aromatic or heteroaromatic group, and mixtures thereof.

16. The phase change ink component of claim 13, wherein the amorphous compound has a Tg of from about −20 to about 50° C.

17. The phase change ink component of claim 13, wherein the amorphous compound has a viscosity of from about 1 to about 200 at 140° C.

and mixtures thereof.

19. The phase change ink component of claim 18, wherein the amorphous compound has a Tg of from about −20 to about 50° C.

20. The phase change ink component of claim 18, wherein the amorphous compound has a viscosity of from about 1 to about 200 cps at 140° C.

* * * * *